United States Patent [19]

Bomar

[11] Patent Number: 5,048,885
[45] Date of Patent: Sep. 17, 1991

[54] BALE TRANSFER AND FEEDER FRAME

[76] Inventor: James C. Bomar, 3150 Little Dry Creek Rd., Pulaski, Tenn. 38478

[21] Appl. No.: 466,863

[22] Filed: Jan. 18, 1990

[51] Int. Cl.$^5$ ................................................ B60P 3/00
[52] U.S. Cl. ...................................... 296/6; 414/24.5; 410/49
[58] Field of Search ............................. 410/42, 47, 49; 414/24.5, 25; 280/789; 296/3, 6

[56] References Cited

U.S. PATENT DOCUMENTS

| | | | |
|---|---|---|---|
| 3,922,036 | 11/1975 | Kalsbeck et al. | 414/24.5 X |
| 4,092,050 | 5/1978 | Sobeck | 414/24.5 X |
| 4,138,159 | 2/0679 | Hall . | |
| 4,253,786 | 3/1981 | Harkness | 414/24.5 |
| 4,334,817 | 6/1982 | Vansickle et al. | 414/24.5 |
| 4,411,572 | 10/1983 | Hostetler | 414/24.5 |
| 4,580,843 | 4/1986 | Lund | 414/24.5 X |
| 4,784,546 | 11/1988 | Johnson | 414/24.5 X |

Primary Examiner—David A. Bucci
Assistant Examiner—Craig Slavin
Attorney, Agent, or Firm—Banner, Birch, McKie & Beckett

[57] ABSTRACT

A bale transfer and feeder frame designed to be removably attached to an existing farm wagon. The frame is made from tubing and is of relatively lightweight but sturdy construction. Bales can be loaded onto the frame by almost any tractor because of the low slung construction. Additionally, the structure prevents movement of the bales during transportation or feeding.

17 Claims, 2 Drawing Sheets

BALE TRANSFER AND FEEDER FRAME

FIELD OF THE INVENTION

This invention relates to devices that operate as transfer and feeder mechanisms and more particularly to the frame structure of such a mechanism.

BACKGROUND OF THE INVENTION

Transfer and feeder mechanisms are known in the art as exemplified by the U.S. patents to Johnson, U.S. Pat. No. 4,784,546 to Hostetler, U.S. Pat. No. 4,411,572, to Hall, U.S. Pat. No. 4,138,159, to Kalsbeck, U.S. Pat. No. 3,922,036, and to Vansickle, U.S. Pat. No. 4,334,817.

U.S. Pat. No. 4,784,546 to Johnson discloses a hay cradle which comprises two longitudinally extending beams having a series of cross members to cradle a bale of hay. As can be seen in FIG. 4 of Johnson, the bale of hay is cradled shallowly within the cross members. Given sufficient momentum, the bale of hay can be jarred from the cross members and roll from the cradle.

U.S. Pat. No. 4,411,572 to Hostetler discloses a hay cradle including a central tubular beam and a plurality of bale support cradles. As can be seen in FIGS. 8 and 9, the cradles are pivotable about the longitudinal axis allowing the bales of hay to be deposited on the ground at the point where feeding is to occur.

U.S. Pat. No. 4,138,159 to Hall discloses a hay cradle similar to the Hostetler cradle. However, this device uses two longitudinally extending beams and the cradles are located such as to tilt upon an eccentric axis to deposit the hay at the point of feeding.

U.S. Pat. No. 3,922,036 to Kalsbeck also discloses another hay cradle similar to the Hall device wherein the hay cradles are pivoted about an axis to deposit the hay for feeding.

U.S. Pat. No. 4,334,817 to Vansickle discloses a device for lifting large cylindrical bales of hay. As can be seen from all of the above hay bale transfer devices, each must be formed integrally with a set of wheels. If the farmer has to purchase another piece of equipment, then this adds to his cost of production and lessens his profit. For the small or independent farm, such cost can be of tremendous impact. What is needed by farmers is a device that does not cost as much as the traditional cradles and one that performs in a manner superior to the above cradles.

ADVANTAGES OF THE INVENTION

The principal advantages of the invention are to provide a device that can be easily loaded by any size tractor and can be used with an existing farm wagon to operate as a bale transfer and feeder device, thus reducing the expense of the farming operation.

Other notable advantages of the invention are that bales are designed to stay in place whether over rough terrain or when the animals are feeding from the device. The device is relatively inexpensive and light weight and also formed of a sturdy construction.

Other advantages of this invention will become apparent from the following specifications and drawings which are merely illustrative of one embodiment of the invention.

SUMMARY OF THE INVENTION

The present invention is a device for transferring bales of straw or hay and for operating as a feeder. The device as embodied in the specification and drawings comprises a frame structure that is removably attached to a farm wagon. A farm wagon is considered to be any type of flat bed trailer structure having wheels or other means to enable locomotion of that structure.

Bales of straw or hay are positionable in cradles formed on the base of the frame. Antiroll bars and truss members reduce the effort in transport and feeding by eliminating the need for typing the bales for transport and also preventing movement during feeding.

The use of an existing farm wagon lessens the cost to the farm by enabling greater production from the existing equipment. Furthermore, the present invention, by doubling as a transport cradle and as a stationary feeder, allows a farmer to get the most use out of a piece of equipment that may be lying fallow.

DETAILED DESCRIPTION OF THE PREFERRED EMBODIMENT

Most farmers have at least one farm wagon which they use infrequently. The present invention is desgined to make better use of this wagon by allowing a frame structure to be attached to the existing wagon.

Figure 1:
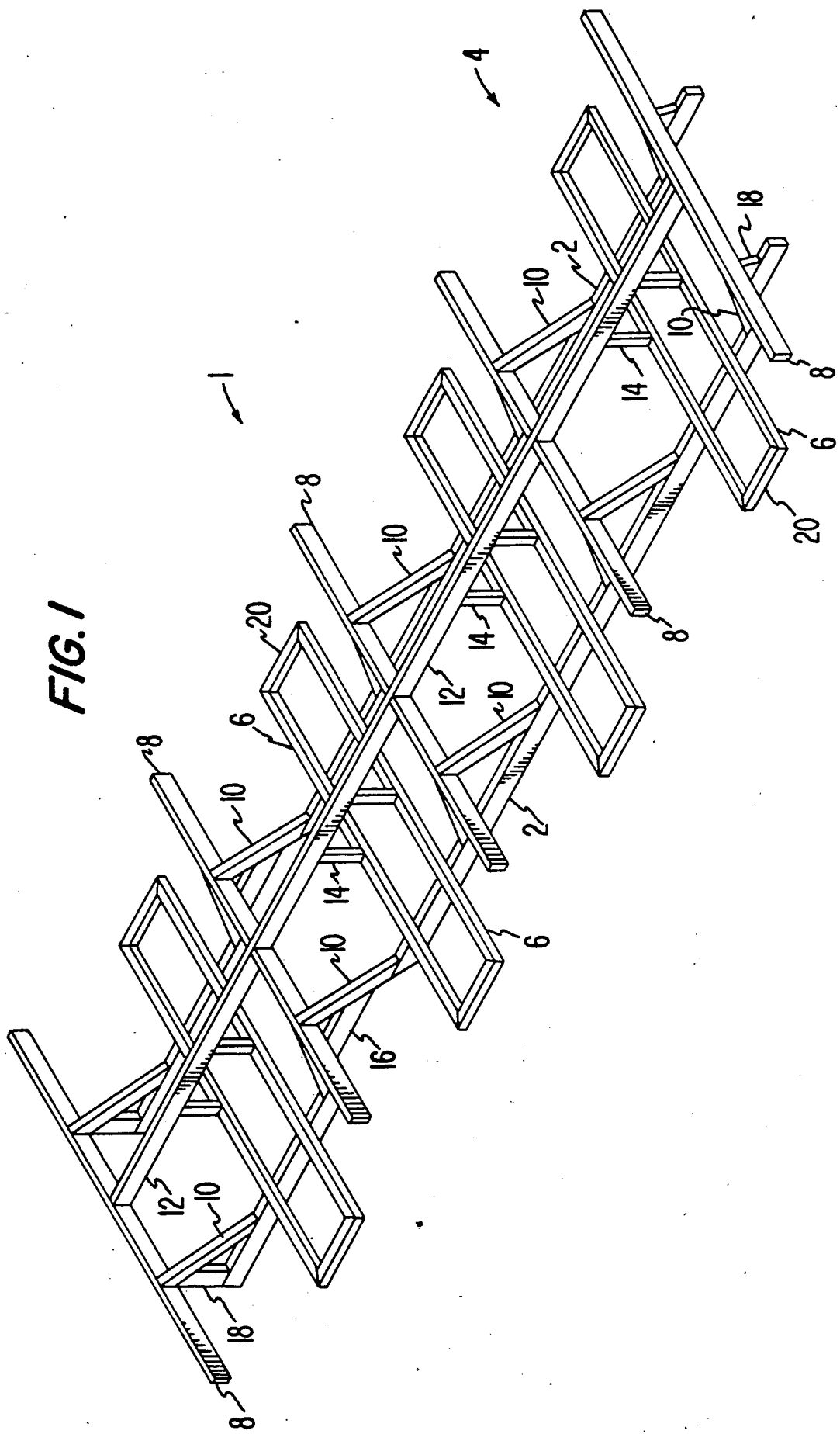
FIG. 1 is a perspective view of the preferred embodiment of the transfer feeder frame.

FIG. 1 discloses the preferred embodiment of the transfer feeder frame in perspective view. Reference numeral 1 indicates the transfer feeder frame.

The frame comprises a base consisting of two longitudinally extending lower beams 2. Rigidly and fixedly attached to the base are a series of cradles 4. Each cradle comprises two cross beam supports 6 and two antiroll bars 8 which are positioned one on either side of the cross beam supports 6. The antiroll bars 8 are held fixedly in place by at least one truss member 10.

Positioned midway between the lower beams 2 and positioned at a distance above the lower beams 2 is a longitudinally extending stop member 12. The stop member 12 is fixedly attached to the cross beam supports 6 through columns 14. The stop member 12 extends completely the total length of the frame 1. As can be seen from FIG. 1, the stop member 12 is in the same horizontal plane as the antiroll bars 8.

Notice should be taken of the fact that lower beams 2 are split asymmetrically relative to the minor axis of the frame 1. The truss members 10 at the split are interconnected by a beam member 16 which provides support and allows the device to be fitted over the wheels of an existing wagon. Using the bale transfer and feeder frame with an existing farm wagon reduces the cost to the farmer, however, it is envisioned that the device could be sold as an integral frame and wagon. The end antiroll bars 8 are supported by a truss 10 and a column member 18. Further adding to the load carrying capacity cross beam supports 6 are designed to extend outwardly from the base and are interconnected by an additional beam 20. Different means can be employed instead of the cross beam supports 6, such means includes but is not limited to: a single beam, plates, grating or wire mesh.

Figure 2:
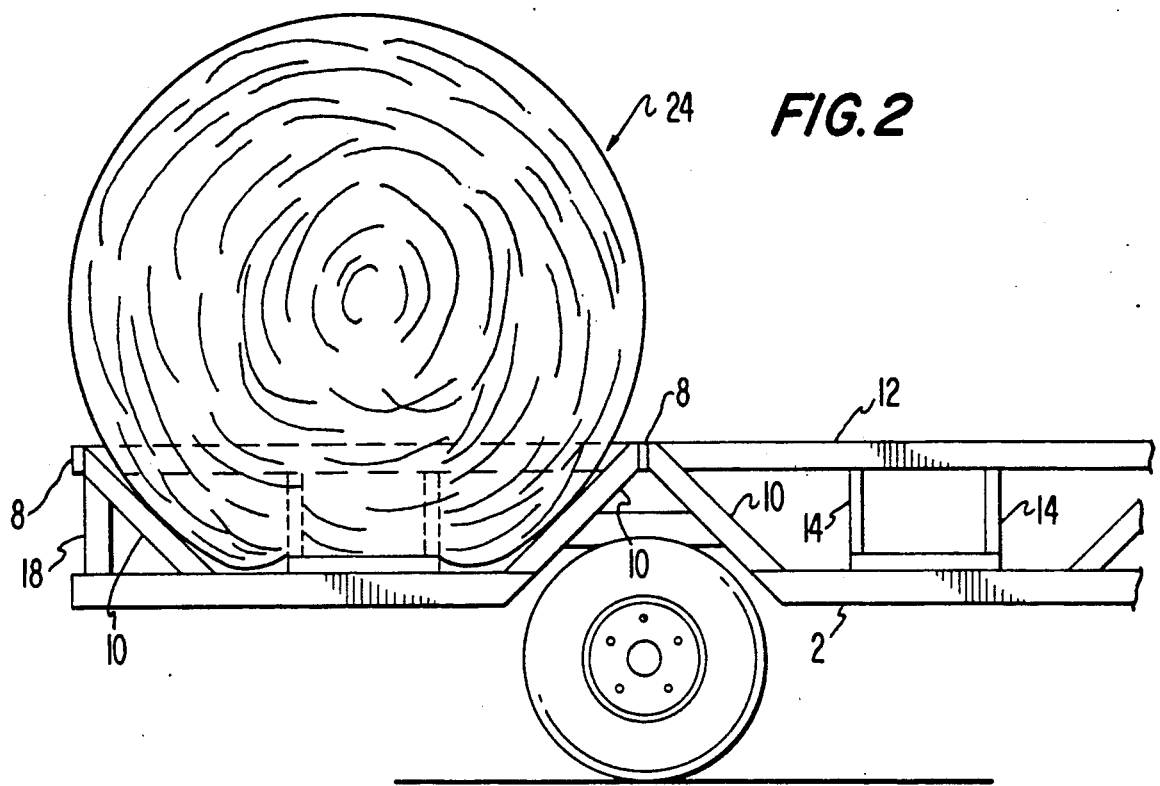
FIG. 2 shows the preferred embodiment of the transfer feeder frame attached to a wagon.

As can be seen in FIG. 2, the frame 1 is attached to the farm wagon by the use of fastener means such as screws, bolts, pins or any other removable type fastener.

The preferred embodiment of the frame is made of 11 gauge tubing and solid welded construction. The device is intended to be of relatively light weight for carrying loads. The preferred embodiment discloses a device which can carry eight bales of hay. Each bale of hay has an approximate weight of 1,500 to 3,000 lbs, as compared to the frame weight of approximate 1,000 lbs.

Figure 3A:
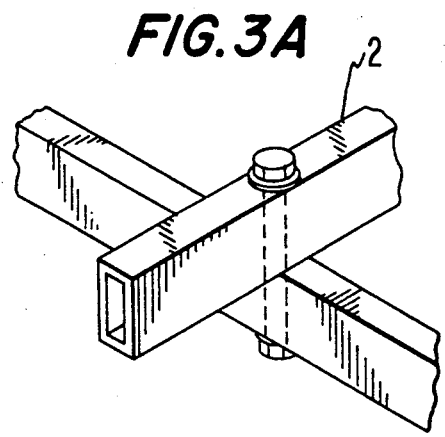
FIGS. 3A and 3B are views typical of the construction of the preferred embodiment of the transfer feeder frame.
Figure 3B:
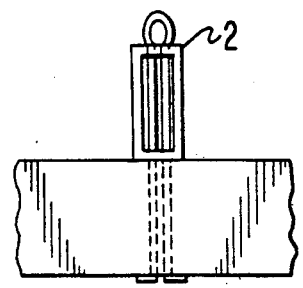

Bales 24 (FIG. 3) of hay or straw are loaded in the frame 1 such that the truss members 10 support the bales 24 of hay or straw and prevent them from sliding out. In addition, the antiroll bars 8 prevent the hay or straw from rolling out of the cradle 4. The truss members 10 also prevent the hay from being pulled or butted from the cradle by an animal as he is eating. Forcing the animals to eat the bale 24 of hay or straw from the cradle 4 prevents waste from occurring. Deeply cradling the bale 24 also avoids the necessity of tying the hay or straw to the cradle 4 when transferring the bales 24 from place to place.

Additionally, the frame is formed rather close to the ground such that the bales of hay can be loaded by almost any size tractor thus enabling the device to be used by most farmers. Furthermore, the frame device can be attached to almost any existing wagon that a farmer might have, thus enabling universality of the invention.

It is to be understood that the embodiment of the invention herein shown and described must be taken as a preferred representation of the invention. Thus, it is to be obvious to one of ordinary skill in the art that numerous modifications and changes may be made without departing from the true spirit and scope of the invention which is to be limited only by the appended claims.

What is claimed is:

1. A bale transfer and feeder frame comprising:
   a base comprising two lower beams that extend parallel to the longitudinal axis of the frame;
   at least one cradle rigidly and fixedly connected to the base, said cradle comprising means for supporting a bale extending transversely to the longitudinal axis of the frame;
   one antiroll bar being positioned on either side of the support means;
   an upper longitudinally extending stop member connected to the support means and to the antiroll bars; and
   truss members joining the antiroll bars to the base, such that the truss member inhibit movement of a bale transverse to the frame longitudinal axis when a bale is positioned in the cradle.

2. The frame as described in claim 1 wherein the lower beams are split to provide room for a wheel.

3. The frame as described in claim 1 wherein the means for support comprises two cross beam supports.

4. The frame as described in claim 3 wherein the cross beam supports extend outwardly from the lower beams.

5. The frame as described in claim 4 wherein each pair of cross beams is interconnected by an additional beam.

6. The frame as described in claim 1 wherein a plurality of rows of cradles are formed.

7. A bale transfer and feeder device comprising:
   two elongated lower beams extending parallel to a longitudinal axis of the frame, said lower beams being rigidly interconnected by at least one pair of cross beam supports;
   one upper stop member having a longitudinal axis extending parallel to the longitudinal axis of the frame and rigidly interconnected to the cross beam supports;
   at least two antiroll bars extending perpendicular to the stop member, each said antiroll bar being positioned one on either side of the cross beam supports;
   wherein the antiroll bars are connected to the stop member; and
   means attached to the frame for inhibiting movement of a bale transverse to the frame longitudinal axis and away from said stop member when a bale is positioned in the cradle.

8. The frame as described in claim 7 wherein the lower beams are split to provide room for a wheel.

9. The frame as described in claim 7 wherein the cross beam supports extend outwardly from the longitudinally extending lower beams.

10. The frame as described in claim 9 wherein each pair of cross beams is interconnected by an additional beam.

11. A bale transfer and feeder frame and wagon comprising:
    a base comprising two lower beams that extend parallel to the longitudinal axis of the frame;
    at least one cradle rigidly and fixedly connected to the base, said cradle comprising means for supporting a bale extending transversely to the longitudinal axis of the frame;
    one antiroll bar being positioned on either side of the support means;
    an upper longitudinally extending stop member connected to the support means and to the antiroll bars;
    truss members joining the antiroll bars to the base, such that the truss members inhibit movement of a bale transverse to the frame longitudinal axis when a bale is positioned in the cradle; and
    a wagon frame having wheels to enable locomotion; and means adapted to removably attach the transfer feeder frame to the wagon frame.

12. The frame as described in claim 11 wherein the lower beams are split to provide room for the wheels.

13. The frame as described in claim 12 further comprising a short beam member for connecting the truss members adjacent the split in the lower beams.

14. The frame as described in claim 11 further comprising a plurality of pairs of cross beam supports extend outwardly from the lower beams.

15. The frame as described in claim 14 wherein each pair of cross beams is interconnected by an additional beam.

16. The frame as described in claim 11 wherein a plurality of rows of cradles are formed.

17. The frame as described in claim 7 wherein the stop member and the antiroll bars are in the same horizontal plane.

* * * * *